(12) United States Patent
Bachmann et al.

(10) Patent No.: US 8,545,097 B2
(45) Date of Patent: Oct. 1, 2013

(54) TURBOCHARGER OVERHEATING PROTECTION DEVICE AND METHOD OF ITS MANUFACTURE

(75) Inventors: Mario Bachmann, Leimersheim (DE); Karlheinz Wienand, Aschaffenburg (DE)

(73) Assignee: Heraeus Sensor Technology GmbH, Hanau (DE)

( * ) Notice: Subject to any disclaimer, the term of this patent is extended or adjusted under 35 U.S.C. 154(b) by 0 days.

(21) Appl. No.: 13/287,415

(22) Filed: Nov. 2, 2011

(65) Prior Publication Data
US 2012/0110997 A1    May 10, 2012

(30) Foreign Application Priority Data

Nov. 4, 2010   (DE) .......................... 10 2010 050 216

(51) Int. Cl.
G01K 1/00    (2006.01)
G01K 7/00    (2006.01)

(52) U.S. Cl.
USPC ........... 374/208; 374/179; 374/183; 374/185; 374/163

(58) Field of Classification Search
USPC .......................... 374/179, 208, 185, 183, 163
See application file for complete search history.

(56) References Cited

U.S. PATENT DOCUMENTS

| | | | | |
|---|---|---|---|---|
| 2,463,427 A | * | 3/1949 | Richards | 374/140 |
| 3,199,352 A | * | 8/1965 | Macatician | 374/30 |
| 3,723,935 A | * | 3/1973 | Frazier et al. | 338/28 |
| 4,666,656 A | * | 5/1987 | Bertrand | 376/247 |
| 8,328,419 B2 | | 12/2012 | Wienand et al. | |
| 2007/0171959 A1 | * | 7/2007 | Irrgang et al. | 374/185 |
| 2008/0036569 A1 | | 2/2008 | Houben et al. | |
| 2009/0147826 A1 | | 6/2009 | Suzuki et al. | |
| 2010/0091817 A1 | | 4/2010 | Wienand et al. | |
| 2011/0013669 A1 | * | 1/2011 | Raj et al. | 374/179 |

FOREIGN PATENT DOCUMENTS

| | | |
|---|---|---|
| DE | 72 602 | 4/1970 |
| DE | 3620246 A1 * | 12/1987 |
| DE | 10 2006 034 246 B3 | 11/2007 |
| DE | 10 2007 010 403 A1 | 9/2008 |
| EP | 0082020 A2 | 6/1983 |

(Continued)

OTHER PUBLICATIONS

Heraeus Brochure "Platinum thin section sensors, which convince.." (Apr. 2006).

(Continued)

Primary Examiner — Mirellys Jagan
(74) Attorney, Agent, or Firm — Panitch Schwartz Belisario & Nadel LLP

(57) ABSTRACT

A housing between mineral-insulated cable and connecting wire in a turbocharger overheating protection device may include the following characteristics:
coiled regions of springs (10) arranged point-symmetrically to each other; or
the springs (10) are not placed on axes; or
the coil regions of the coil springs (10) for cushioning the film resistor are shorter than its substrate length and longer than its substrate width; or
the connecting wires of the film resistor are shorter than its substrate length and longer than its substrate width; or
the springs are arranged staggered in their longitudinal direction adjacent to each other; or
coil springs (10) are used, in which the coils are located only in one half of the spring (10) and the coils of one spring are arranged staggered in the longitudinal direction to the coils of the other spring (10).

5 Claims, 2 Drawing Sheets

(56) References Cited

FOREIGN PATENT DOCUMENTS

| EP | 332396 A2 | * | 9/1989 |
|---|---|---|---|
| EP | 2 068 137 A2 | | 6/2009 |
| EP | 2 075 557 A2 | | 7/2009 |
| JP | 54103086 A | * | 8/1979 |
| JP | 57-002102 A | | 1/1982 |
| JP | 58-104938 A | | 6/1983 |
| JP | 61139731 A | * | 6/1986 |
| JP | 04282427 A | * | 10/1992 |
| JP | 05340823 A | * | 12/1993 |
| JP | 2010-520443 A | | 6/2010 |
| KR | 10-2009-0127880 A | | 12/2009 |
| WO | 2008104259 | | 9/2008 |

OTHER PUBLICATIONS

Heraeus Brochure HSC-W2/D (Apr. 1994).
Office Action Issued Jun. 22, 2011 in German Appln. Ser. No. 10 2010 050 216.2.
Korean Patent Office issued Office Action Apr. 2, 2013.

* cited by examiner

Fig. 1
Fig. 2
Fig. 3
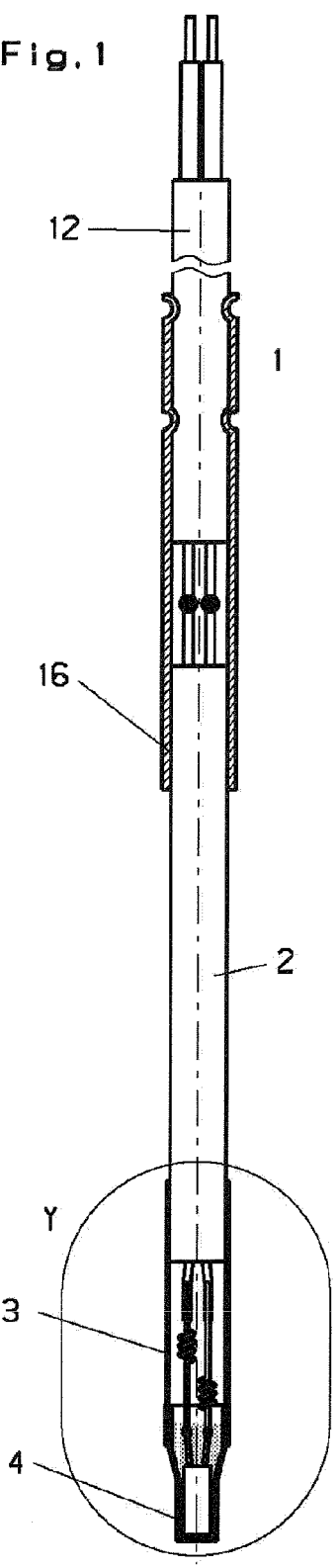
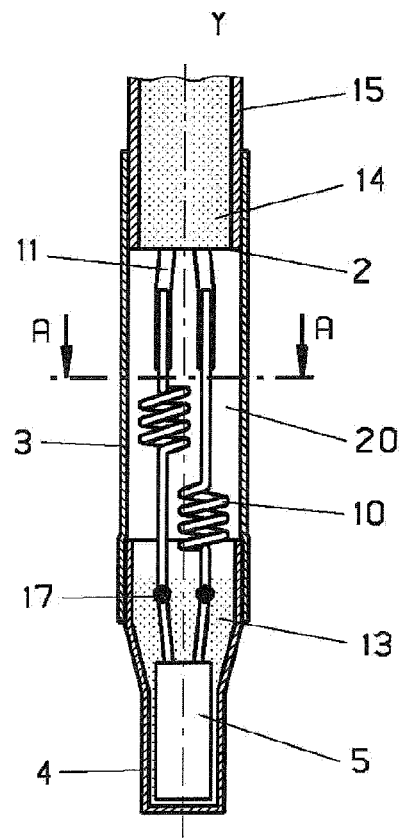
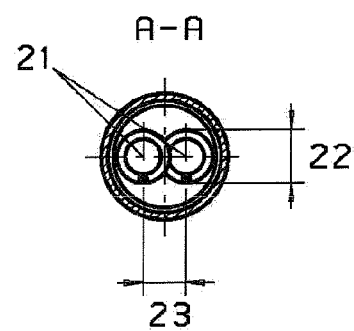

TURBOCHARGER OVERHEATING PROTECTION DEVICE AND METHOD OF ITS MANUFACTURE

BACKGROUND OF THE INVENTION

The present invention relates to spring-cushioned measuring resistors, which are embedded within a bushing in a ceramic casting. In particular, the invention relates to a turbocharger overheating protection device for preventing overheatings of the turbocharger of diesel engines whose turbocharger withstands a temperature range of −50 to +950° C., comprising a metal housing made of a mineral-insulated cable (also referred to as MIL), a receptacle and a sleeve projecting partly over each of the mineral-insulated cable and the receptacle, wherein a temperature measuring element is completely embedded in ceramic casting in the receptacle, the temperature measuring element is a measuring resistor or thermistor equipped with connecting wires, the connecting wires are connected by coil springs with the cores of the mineral-insulated cable. Furthermore, the invention relates to a method for manufacturing a turbocharger overheating protection device and its use.

A measuring resistor, in particular a film resistor or a thermistor, can be used as a temperature measuring element. A film resistor is a chip having connecting wires to thin film strip conductors on a substrate and a stress relief made of glass, which covers the connection region of the connecting wires and the strip conductor. Film resistors are known from the Heraeus brochure HSG-W2/D (April 1994).

German Democratic Republic Patent DD 72 602 teaches the cushioning of thermocouple wires by configuring them as coils. The arrangement of the elastic coils results in stress relief of the thermocouple wires and thereby prevents excessive mechanical stress, particularly breakages, which occur upon relative changes in length between the protection tube and the thermocouple wires clamped on both sides.

German Patent DE 10 2006 034 246 B3 discloses an offset bend in the connecting wire of the film resistor. The exposed connecting wires cannot withstand the high thermal and mechanical loads of turbochargers and break in the region of the offset bend.

German published patent application DE 10 2007 010 403 A1 discloses a construction suitable for turbochargers, in which the connecting wires are connected with one spring each, which is attached to the respective supply wire. The coil springs attached to the supply wires are stabilized by the supply lead as an axis and are used in the range of 900° C. to 1200° C.

BRIEF SUMMARY OF THE INVENTION

The object of the present invention is to shorten the response time and to provide a simpler design, which withstands lower temperature requirements at increased vibration loads.

According to the invention, it was recognized that the coils of the coil springs should be better spaced apart from each other and that the risk of breakage of the connecting wire increases with increasing dimensions of the film resistor and increasing width of the substrate and decreases with increasing length of the coil spring. For achieving the object, in particular, a film resistor is used whose connecting wires are shorter than its substrate length and longer than its substrate width. In particular, the coil springs for cushioning the film resistor are likewise shorter than its substrate length and longer than its substrate width. Here, the substrate length is greater than the substrate width.

To achieve the object, according to the invention, the springs are arranged such that the coils cannot touch each other. This avoids the elaborate arrangement of the coils around guide axes. In particular, the spring region according to the invention exhibits a point symmetry relative to the arrangement of the springs to each other, i.e., in contrast to the previously known mirror symmetry. In this way, the coils can also be arranged point-symmetrically to each other, if two different, namely point-symmetrical coils, are used. Preferably, identically constructed springs are used, which means that the coils in the point-symmetrical arrangement of the coil regions are arranged rotation-symmetrically to each other. An air space between a casting in a measuring tip and a mineral-insulated cable (MIL) present around the springs and limited by a sleeve provides higher measurement accuracy. This is based on the induced thermal decoupling between the casting and the mineral-insulated cable. The point-symmetrical arrangement of the coiled regions of the springs relative to each other allows overlapping of their main axes.

Thus, the invention relates to a turbocharger overheating protection device for preventing overheatings of the turbocharger of diesel engines, whose turbocharger withstands a temperature range from −50 to +950° C., comprising a metal housing made of a mineral-insulated cable (also referred to as MIL), a receptacle and a sleeve projecting partly over the mineral-insulated cable and the receptacle, wherein a temperature measuring element is completely embedded in ceramic casting in the receptacle, the temperature measuring element is equipped with connecting wires, and wherein the connecting wires are connected via coil springs with the cores of the mineral-insulated cable, characterized in that the spacing of the main axes of the coil springs from each other is at the most as large as the diameter of the coil springs.

Advantageously, the turbocharger overheating protection device may be characterized in that the coil springs are arranged staggered in their longitudinal direction adjacent to each other, or coil springs in which the coils are located only in one half of the spring and the coils of one spring are arranged staggered in the longitudinal direction to the coils of the other spring. It can be expedient that the springs are not placed on axes. Another advantageous embodiment consists in that the coil regions of the coil springs for cushioning the temperature measuring element having a substrate are shorter than its substrate length and longer than its substrate width.

Another embodiment of a turbocharger overheating protection device according to the invention, or advantageous embodiment in connection with an above-described turbocharger overheating protection device, for preventing overheatings of the turbocharger of diesel engines, whose turbocharger withstands a temperature range from −50 to +950° C., comprising a metal housing made of a mineral-insulated cable, a receptacle and a sleeve projecting partly over each of the mineral-insulated cable and the receptacle, wherein a temperature measuring element is completely embedded in a ceramic casting in the receptacle, and the temperature measuring element is equipped with connecting wires, and wherein the connecting wires are connected via coil springs to the cores of the mineral-insulated cable, is characterized in that the regions coiled around the main axis of the coil springs are each arranged opposite to a stretched section of the opposite cable, or the connecting wires of the temperature measuring element having a substrate are shorter than its substrate length and longer than its substrate width or the coil springs for cushioning the temperature measuring element are shorter than its substrate length and longer than its substrate width.

Preferably, the temperature measuring element is a measuring resistor equipped with connecting wires, or specifically a film resistor or a thermistor.

The method according to the invention for manufacturing a turbocharger overheating protection device, in which a temperature measuring element, which can be configured as measuring resistor, particularly film resistor, or as thermistor, is completely embedded with ceramic casting within a receptacle, wherein connecting wires of the temperature measuring element are connected to a coil spring each, which compensate for the relative length changes between the receptacle and the wires contained therein, is characterized in that the coils of the coil springs are located in only one half of the coil springs and these coil springs are installed such that the coils of a spring are arranged staggered in the longitudinal direction to the coils of the other spring.

According to the invention, the use of an above-described turbocharger overheating protection device is for engines having a maximum exhaust gas temperature of 850° C.-950° C., and the use of such a turbocharger overheating protection device is for diesel engines.

For achieving the object of the invention it is therefore essential that the spacing between the spring axes is at the most as large as the diameter of the coils.

If the two coil springs are arranged staggered in their longitudinal directions adjacent to each other, the airspace is used more efficiently. In particular, the air space is slimmed down and the measurement accuracy and response time are thereby concomitantly improved. The slimming down also allows a saving of nickel, particularly a thinner mineral-insulated cable, e.g. a diameter of 4.5 mm to 3 mm. Incidentally, there results a shortening of the mineral-insulated cable. In coil springs, whose coils are located only in one half of the spring, the coils of one spring are arranged staggered in the longitudinal direction relative to the coils of the other spring.

To prevent overheatings of the turbocharger of diesel engines, whose the turbocharger withstands a temperature range from −50 to +950° C., a turbocharger overheating protection device is provided, comprising a metal housing made of a mineral-insulated cable, a receptacle and a sleeve projecting partly over each of the mineral-insulated cable and the receptacle. Inside the receptacle, a temperature measuring element is completely embedded in ceramic casting. The temperature measuring element is a measuring resistor equipped with connecting wires, such as a film resistor or thermistor.

Both connecting wires are connected via coil springs with the cores of the mineral-insulated cable. According to the invention, the regions coiled around the main axis of the coil springs are each arranged opposite to a stretched section of the opposite cable.

Preferably, two identically constructed coil springs, in which the coils are located only in one half of the spring, are installed such that the coils of one spring are arranged staggered in longitudinal direction relative to the coils of the other spring. Springs having a length between 5 and 10 mm, in particular between 7 and 8 mm, whose coils extend from 1 to 4 mm, in particular from 2 to 3 mm, have proven themselves successful.

Preferably, the width of a substrate of a film resistor used as a temperature measuring element is less than 2 mm. Beyond a width of 2 mm, the risk of breakage increases. Below a width of 1 mm, processing is currently still too expensive for mass production. A width of between 1.2 and 1.8 mm, in particular between 1.4 and 1.6 mm has proven itself successful. The length of the substrate should be at least 1.5 times as long as its width, particularly at least twice as long. A ratio of length to width from 2.5 to 3 has proven itself successful.

The length of the film resistor is 3 to 7 mm, particularly 4 to 6 mm, the length of the connecting wire of the film resistor is 1 to 5 mm, particularly 1.5 mm to 3.5 mm. Connecting wires having a length less than 1 mm mean too costly manufacturing steps for mass production. The connecting wires of the present invention, which may be realized as short with a length of less than 3 mm, particularly less than 2 mm, save precious metals, particularly platinum.

The danger of a short circuit of the springs arranged adjacent to each another is reduced by short springs. The short springs do not need to be guided on an axis.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the following, the invention is illustrated by way of examples with reference to the drawings. In the drawings:

FIG. 1 is a longitudinal cross-sectional view of a turbocharger overheating protection device according to an embodiment of the invention;

FIG. 2 is an enlargement of the spring region (circled area Y) of FIG. 1;

FIG. 3 is a cross section of the spring region along line A-A of FIG. 2;

DETAILED DESCRIPTION OF THE INVENTION

Figure 4:
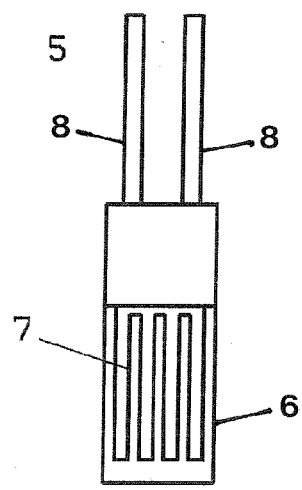
FIG. 4 is a plan view of a film resistor used in the embodiment of FIG. 1.

FIG. 1 shows a temperature sensor 1 as a turbocharger overheating protection device, whose measuring tip can be adapted, particularly bent, corresponding to the requirements of the engine design. This turbocharger overheating protection device with bendable measuring tip has a bendable mineral-insulated cable 2, which is connected via a sleeve 3 to a receptacle 4, in which a film resistor is arranged in a protected manner as a temperature measuring element 5.

Using a film resistor 5 which is resistant to a temperature of 900° C. based on the brochure "Platinum thin film sensors that convince" [Platin Dünnschichtsensoren, die überzeugen] from Heraeus Sensor Technology GmbH, dated April 2006, a high-temperature-sensor element for a temperature range from −40° C. to 900° C. is created. The critical operating temperature for diesel turbochargers is currently above 850° C.

Figure 5:
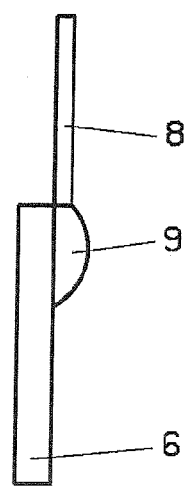
FIG. 5 is a side view of the film resistor shown in FIG. 4.

The film resistor 5 as temperature measuring element illustrated in FIGS. 4 and 5 consists of a meandered platinum thin film 7 applied onto a ceramic substrate 6, in which connecting wires 8 as platinum wires are attached to the ceramic substrate 6 in a stress-relieved manner using a fixing drop 9.

According to FIG. 2, the connecting wires 8 are connected to one coil spring 10 each, wherein the coiled regions around the main axis 21 of the coil springs 10 are each arranged opposite to a stretched section of the opposite cable and are connected at the end with the cores 11 of the mineral-insulated cable 2.

In this way, the connection between the film resistor 5 and the supply cable 12 is produced at least in part in that, between the film resistor 5 and the supply cable 12, cores 11 exit from the mineral insulation of the mineral insulated cable 2 at the end facing the film resistor 5 and are connected electrically and mechanically to one coil spring 10 each.

The film resistor 5 is embedded in a ceramic casting 13 in a metallic receptacle 4, e.g., made of nickel-chromium steel (1.4845) (19-21 wt. % Ni, 24-26 wt. % Cr, ≤2 wt. % Mn, ≤1.5 wt. % Si, remainder Fe) and is electrically connected with supply wires, e.g. 0.25 mm thick, formed into coil springs 10, made of nickel-chromium steel (2.4869) containing 80 wt. % nickel and 20 wt. % chromium, to about 0.5 mm thick cores 11 of the mineral-insulated cable 2. The cores 11, formed e.g. of nickel-chromium steel (1.4845) (19-21 wt. % Ni, 24-26 wt. % Cr, ≤2 wt. % Mn, ≤1.5 wt. % Si, remainder Fe), are embedded in a highly compacted mineral powder 14, which is surrounded by a protective metal sheath 15 made of nickel-chromium steel (1.4845) (19-21 wt. % Ni, 24-26 wt. % Cr, ≤2 wt. % Mn, ≤1.5 wt. % Si, remainder Fe).

The cores 11 of the mineral-insulated cable 2, at their end opposite to the film resistor 5, are connected electrically to 0.6 mm thick conductors of the connecting cable 12 and, in accordance with FIG. 1, are connected mechanically to each other in the tube 16. The tube 16 connects the connecting cable 12 with the metal sheath 15 of the mineral insulated cable 2, in order to achieve the required tightness and mechanical strength.

Both the electrical and mechanical connection of connecting wires 8 of the measuring resistor 5 to the coil springs 10 are produced by laser welding.

This weld connection 17 is completely embedded in the ceramic casting material 13. The casting material 13 protects both the film resistor 5 and its connecting wires 8 and also the weld connection 17 to the secondary coil springs 10 against shocks and vibrations caused by the vehicle.

The connection between the coil springs 10 and the cores 11 of the mineral-insulated cable 2 is produced by laser welding or resistance welding.

The coiled regions (coils) of the coil springs 10 in staggered arrangement are not embedded in the casting material 13, and thereby may move freely and avoid breaks of the supply wires, which would be caused by the different expansion coefficients of the various materials of the sensor, such as ceramic casting material 13, metallic wires 8 or even the metallic receptacle 4, and which would cause an interruption of the sensor signal and thus would result irrevocably in the failure of the sensor.

As shown in FIG. 2, a gas-tight mechanical connection between the receptacle 4 and the mineral-insulated cable 2 is provided by the metal jacket 15 via laser welding.

The gas-tight connection of receptacle 4 and mineral-insulated cable 2 via the sleeve 3 protects the inner sensor assembly, having measuring element 5, coil springs 10 and casting material 13, against aggressive components of the exhaust gas of combustion engines.

The arrangement of the coiled regions (coils) around the main axes 21 of the coil springs 10, shown in FIG. 3, opposite and adjacent to a stretched section of the opposite cable allows a miniaturization of the sensor and consequently reaches a response time of about 5 seconds at a temperature jump of 30° C. to 330° C. at a gas velocity of 11 m/s. This represents an improvement of about 20% over previous closed temperature sensors. Also shown in FIG. 3 is the diameter 22 of the coil springs 10 and the spacing 23 of the main axes 21 relative to each other, (the spacing 23 of the main axes 21 is smaller than the diameter 22 of the coil springs 10), the size ratio of which determines the compactness of the arrangement.

The air space 20 defined by sleeve 3 between mineral-insulated cable 2 and receptacle 4, which is partially filled with casting material 13, leads to an additional improvement of the response time, because the drain of thermal energy from the hot receptacle 4, containing the measuring element 5, to the mineral-insulated cable 2, thus to the usually colder end of the temperature sensor, is greatly reduced. The main reason for this is both the low thermal conductivity and the low heat capacity of air compared to a ceramic insulating material, such as aluminum oxide or magnesium oxide.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A turbocharger overheating protection device for prevention of overheatings of a turbocharger of a diesel engine, whose turbocharger withstands a temperature range from −50 to +950° C., the device comprising a metal housing made of a mineral-insulated cable (2), a receptacle (4), a sleeve (3) projecting partly over each of the mineral-insulated cable (2) and the receptacle (4), and a temperature measuring element (5) completely embedded in a ceramic casting (13) in the receptacle (4), wherein the temperature measuring element (5) is equipped with connection wires (8), wherein the connection wires (8) are connected via coil springs (10) with cores of the mineral-insulated cable (2), and wherein a spacing (23) of main axes (21) of coil springs (10) from each other is at most as large as a diameter (22) of the coil springs (10) and wherein the coil springs (10) are arranged staggered in their longitudinal direction adjacent to each other.

2. The turbocharger overheating protection device (1) according to claim 1, wherein the coil springs (10) are not placed on guide axes.

3. The turbocharger overheating protection device (1) according to claim 1, wherein coil regions of the coil springs (10) for cushioning the temperature measuring element (5), which have a substrate, are shorter than its substrate length and longer than its substrate width.

4. A turbocharger overheating protection device (1) for prevention of overheatings of a turbocharger of a diesel engine, whose turbocharger withstands a temperature range from −50 to +950° C., the device comprising a metal housing made of a mineral-insulated cable (2), a receptacle (4), a sleeve (3) projecting partly over each of the mineral-insulated cable (2) and the receptacle (4), and a temperature measuring element (5) completely embedded in a ceramic casting (13) in the receptacle, wherein the temperature measuring element (5) is equipped with connection wires (8), wherein the connection wires (8) are connected via coil springs (10) to cores of the mineral-insulated cable (2), and wherein regions coiled around a main axis (21) of the coil springs (10) are each arranged opposite to a stretched section of an opposite cable.

5. The turbocharger overheating protection device (1) according to claim 1, wherein the temperature measuring element (5) is a measuring resistor or a film resistor or a thermistor equipped with connecting wires (8).

* * * * *